United States Patent
Kazama et al.

(10) Patent No.: US 6,791,294 B1
(45) Date of Patent: Sep. 14, 2004

(54) SERVO CONTROL SYSTEM

(75) Inventors: Tsutomu Kazama, Tokyo (JP); Kimio Saito, Tokyo (JP); Chihiro Morita, Tokyo (JP); Yuusuke Ushio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/129,532

(22) PCT Filed: Nov. 8, 1999

(86) PCT No.: PCT/JP99/06196

§ 371 (c)(1),
(2), (4) Date: May 7, 2002

(87) PCT Pub. No.: WO01/35522

PCT Pub. Date: May 17, 2001

(51) Int. Cl.$^7$ ................................................. G05F 1/00
(52) U.S. Cl. ........................ 318/677; 318/567; 318/113; 318/569; 318/600; 318/625; 318/49; 318/47; 700/180; 700/189
(58) Field of Search ............................... 318/560, 567, 318/569, 600, 34, 47, 573, 625, 568.2, 677, 678, 49, 113; 700/180, 186, 188, 189

(56) References Cited

U.S. PATENT DOCUMENTS

| | | | | |
|---|---|---|---|---|
| 3,624,371 A | * | 11/1971 | Neal et al. ............. | 235/151.11 |
| 4,611,155 A | * | 9/1986 | Kurakake .................. | 318/603 |
| 5,218,549 A | * | 6/1993 | Kokura et al. ......... | 364/474.31 |
| 5,990,638 A | * | 11/1999 | Aoyama et al. .............. | 318/85 |
| 6,037,738 A | * | 3/2000 | Morita et al. ................ | 318/625 |
| 6,188,194 B1 | * | 2/2001 | Watanabe et al. ........... | 318/625 |

FOREIGN PATENT DOCUMENTS

JP 10-198413 7/1998

* cited by examiner

*Primary Examiner*—Rina I. Duda
(74) *Attorney, Agent, or Firm*—Sughrue Mion, PLLC

(57) ABSTRACT

There is provided a serial transmitting section for serially transmitting a command frame 100 which is sent from a host controller 1 to a positioning type servo amplifier 30 and a command follow-up type servo amplifier 50. In the command frame 100, an information section, into which information to be transmitted is inputted, has discrimination data for showing a selection between the positioning type servo amplifier 30 and the command follow-up type servo amplifier 50. In the positioning type servo amplifier 30 and the command follow-up type servo amplifier 50, there is provided information reading section for reading the content of an information section after the discrimination data of the command frame 100 by the discrimination data of the command frame 100.

2 Claims, 6 Drawing Sheets

SERVO CONTROL SYSTEM

TECHNICAL FIELD

The present invention relates to improvements in a servo control system in which signals are serially transmitted from a host controller to a plurality of servo amplifiers by one dedicated network.

BACKGROUND ART

Referring to FIG. 6, a servo control system according to the related art will be explained below. In FIG. 6, a host controller 1 for sending commands of a target position and moving speed to servo amplifiers 30, 50 includes: a sequence control section 3 for conducting creation of positioning data and the start and stop of operation; and a motion control section 10 for conducting control of the command follow-up type servo amplifier 50.

The sequence control section 3 includes: a CPU 5 for sequence control (hereinafter, referred to as a sequence CPU hereinafter) and a memory 7 for sequence control in which the content of sequence is stored. The motion control section 10 includes: a CPU 12 for motion control (hereinafter, referred to as a motion CPU hereinafter) and a memory 14 for motion control in which the content of motion is stored. Between the sequence CPU 5 and the motion CPU 12, there is provided a dual port memory 8 to which access can be made from both sides so that data can be sent and received.

An output of the sequence control section 3 is connected in series to the positioning type servo amplifiers 30-1 to 30-n, which have no interpolation control function with other shafts but have a positioning function of one shaft by conducting calculation which is not synchronized with the master clock of the host controller 1, through a communication line 20 via an interface 9 for control serial (hereinafter, referred to as I/F hereinafter). These servo amplifiers 30-1 to 30-n are connected with servo motors (not shown).

In order to make up the interpolation control function with other shafts, an output of the motion control section 10 is connected with the command follow-up type servo amplifiers 50-1 to 50-n via an I/F 16 for motion serial and a communication line 40.

In this case, the command follow-up type servo amplifier 50 operates as follows. While the command follow-up type servo amplifier 50 is synchronized with the master clock of the host controller 1, command data of a position, speed and torque are successively calculated. Then, the command follow-up type servo amplifier 50 receives the command data, controls the servo motor according to the command data, and calculates feedback data as information on control result, and then the feedback position, speed and torque are sent to the host controller Referring to FIG. 6, operation of the servo control system configured as described above will be explained below. The sequence CPU 5 sends commands such as a target position, moving speed, setting of time constant of acceleration and deceleration, and a command of positioning activation to the positioning type servo amplifiers 30-1 to 30-n via the I/F 9 for control serial and the communication line 20.

On the other hand, the motion CPU 12 conducts a motion control calculation such as an interpolation calculation and acceleration and deceleration calculation, calculates a command data for each control period, and transmits the calculated data to the command follow-up type servo amplifiers 50-1 to 50-n via the I/F 16 for motion serial and the communication line 40.

According to the above structure, it is possible for the host controller 1 to conduct control for a plurality of servo amplifiers 30, 50, the control involving setting, changing, and reading a parameter and monitoring inside data.

The above servo control system includes the communication lines 20, 40 of two systems for the positioning type servo amplifier 30 and the command follow-up type servo amplifier 50. Therefore, compared with a communication line having one system, the number of I/Fs for serial and connectors therefor is increased.

Accordingly, it is possible to consider a structure in which the servo amplifiers 30, 50 are connected in series to each other and the communication line is formed into one system so that the number of I/Fs for serial can be decreased.

However, in the above servo control system composed of one system of communication line, the following problems may be encountered. When each frame having an address corresponding to each servo amplifier 30, 50 is sent from the host controller 1 by serial communication, the frame transmitting time is increased by the dead time or the like between the frames.

The present invention has been accomplished to solve the above problems. It is an object of the present invention to provide a simple servo control system which conducts controlling by mixedly using a positioning type servo amplifier and a command follow-up type servo amplifier.

DISCLOSURE OF THE INVENTION

A servo control system according to a first aspect comprises:
- a host controller having a master clock, which is a reference of communication, the host controller for sending a command;
- a first servo amplifier controlled based on the command sent from the host controller, the first servo amplifier having a calculating function, which is not synchronized with the master clock;
- a second servo amplifier controlled based on the command sent from the host controller, the second servo amplifier having a calculating function, which is synchronized with the master clock; and
- serial transmitting means for serially transmitting one frame at once, which is the command, having discrimination data indicating the first or the second servo amplifier and control information of the first and the second servo amplifiers in an information section into which information to be transmitted is inputted and serially transmitting from the host controller to the first and the second servo amplifier,
- wherein the first and second servo amplifiers comprise information section reading means for recognizing a local station and reading content of the information section after the discrimination data of the frame based on the local station and the discrimination data of the frame.
- By the controller which serves as rewriting means of the frame, the frame information section can be rewritten from the control information of the first servo amplifier to the control information of the second servo amplifier together with the discrimination data and on the contrary, the frame information section can be rewritten from the control information of the second servo amplifier to the control information of the first servo amplifier. Therefore, while the first and the second amplifiers are connected with the same communication line, the servo amplifier can be flexibly changed according to an object to be controlled.

Therefore, even when the first and the second amplifiers are mixed arranged on the same communication line by one frame, the servo amplifier can be flexibly changed according to an object to be controlled.

The servo control system according to a second aspect, comprises a plurality of the first or the second servo amplifiers, wherein the first or the second servo amplifiers includes:
a reference servo amplifier for communicating by a reference communication period generated based on the master clock;
a multiple time servo amplifier for communicating by a communication period which is multiple times as long as the reference communication period; and
communication switching means for communicating with the multiple time servo amplifier every multiple times of the reference communication period.

BEST MODE FOR CARRYING OUT THE INVENTION

Embodiments of the present invention will be explained as follows.

Embodiment 1

Figure 1:
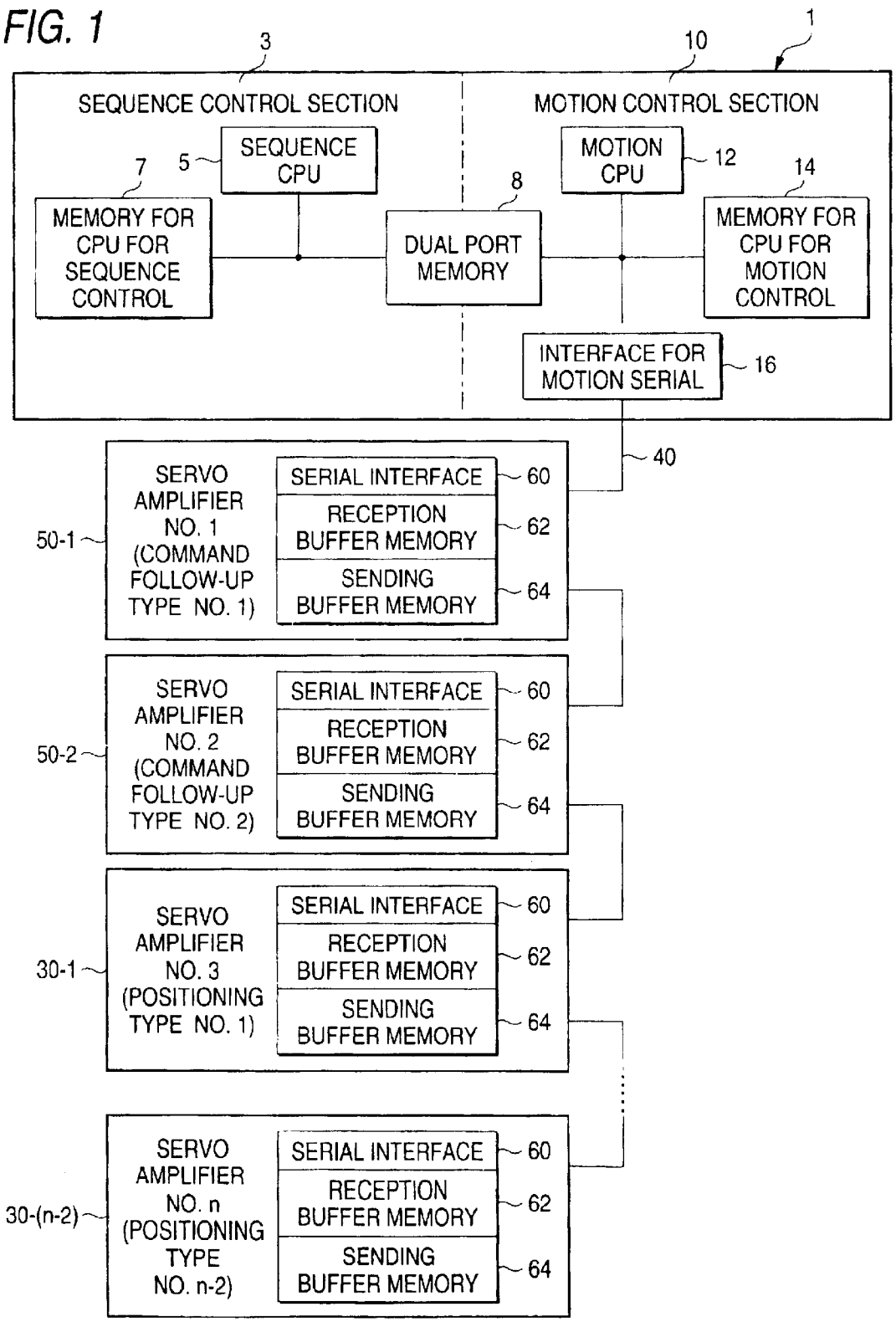
FIG. 1 is an overall arrangement view of a servo control system of an embodiment of the present invention.
Figure 2:
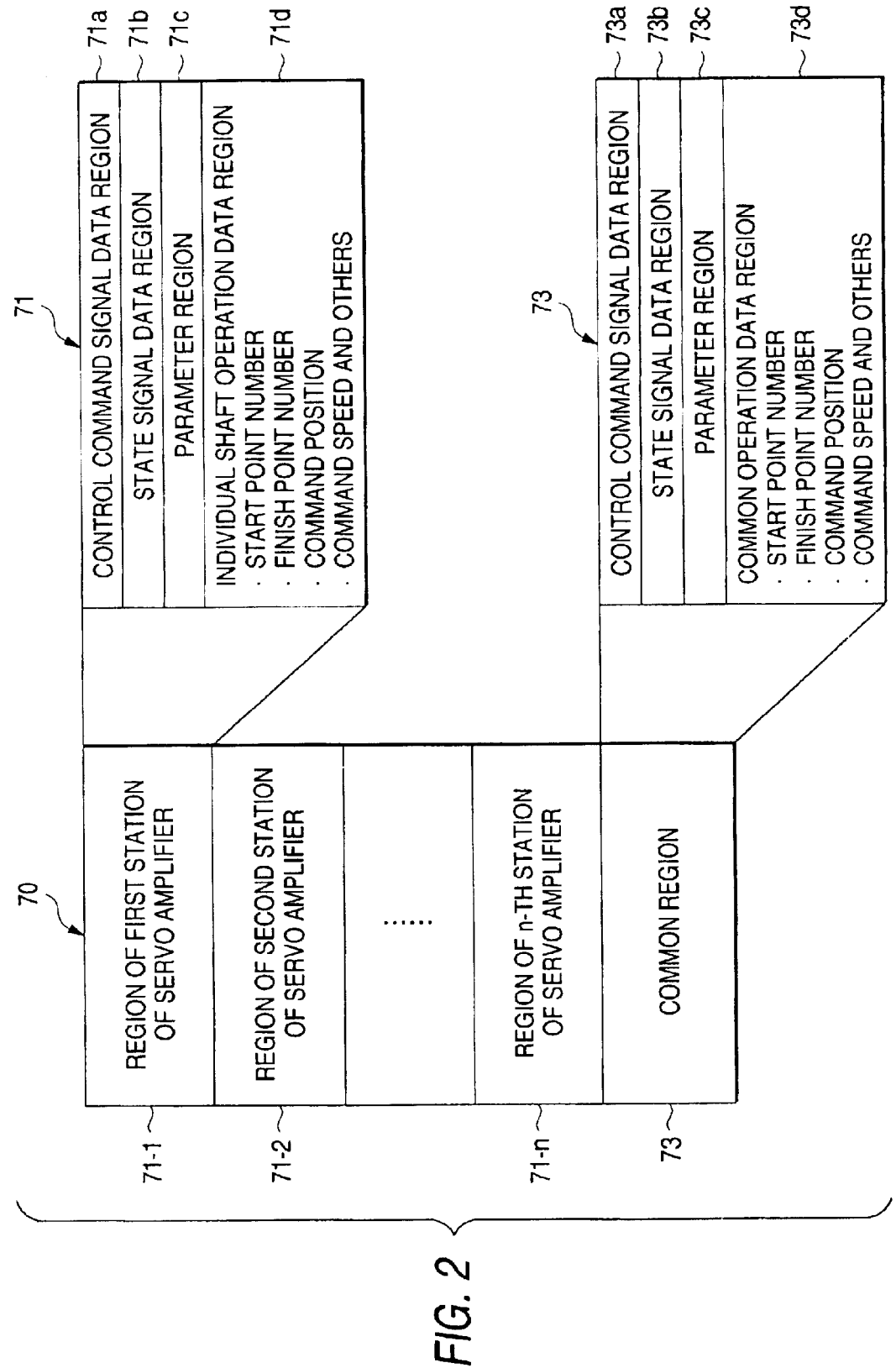
FIG. 2 is a structural view showing a data allocation of a dual port memory in the servo control system shown in FIG. 1.
Figure 3:
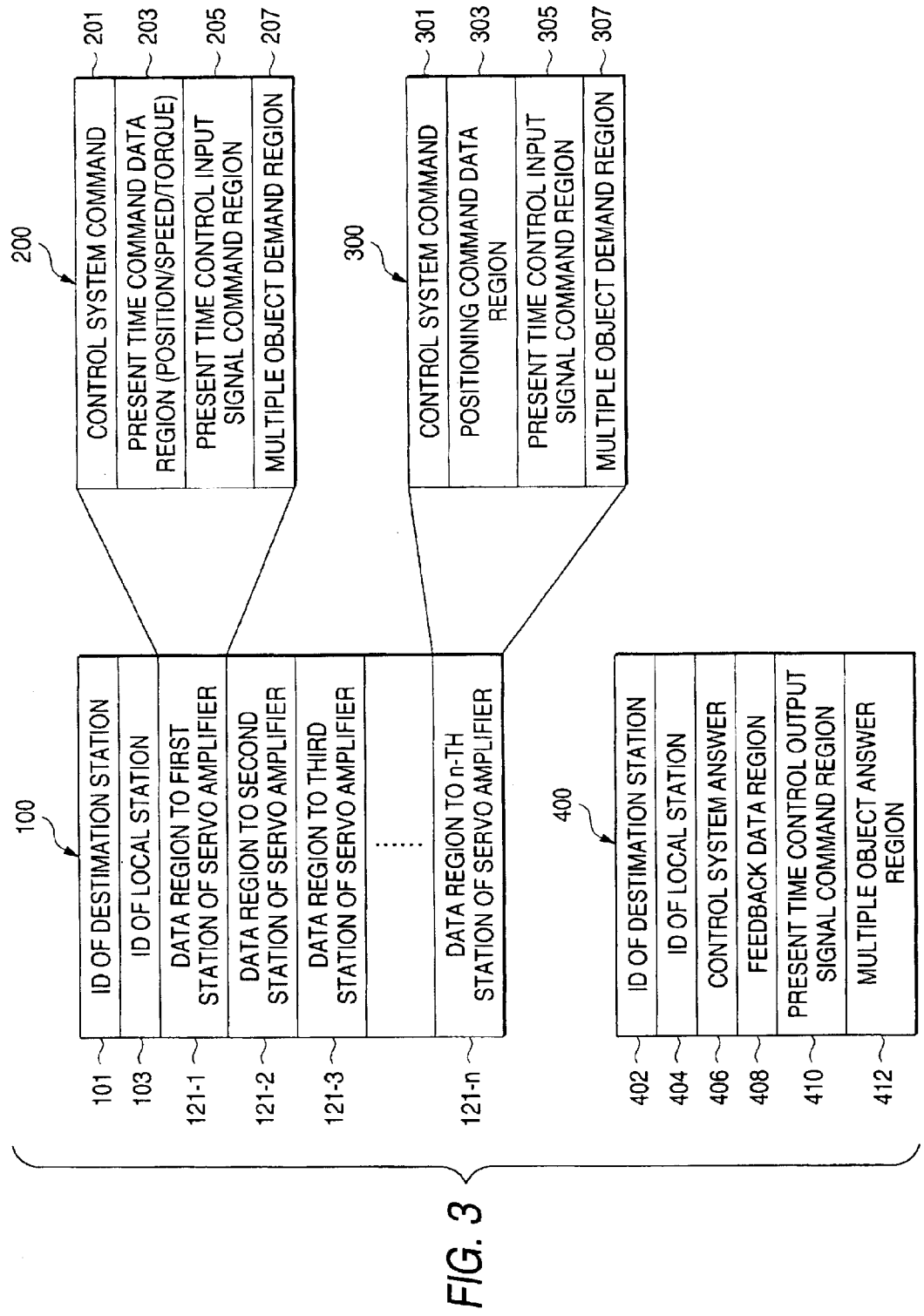
FIG. 3 is a structural view of data of a frame in communication between a host controller and a servo amplifier in the servo control system shown in FIG. 1.
Figure 6:
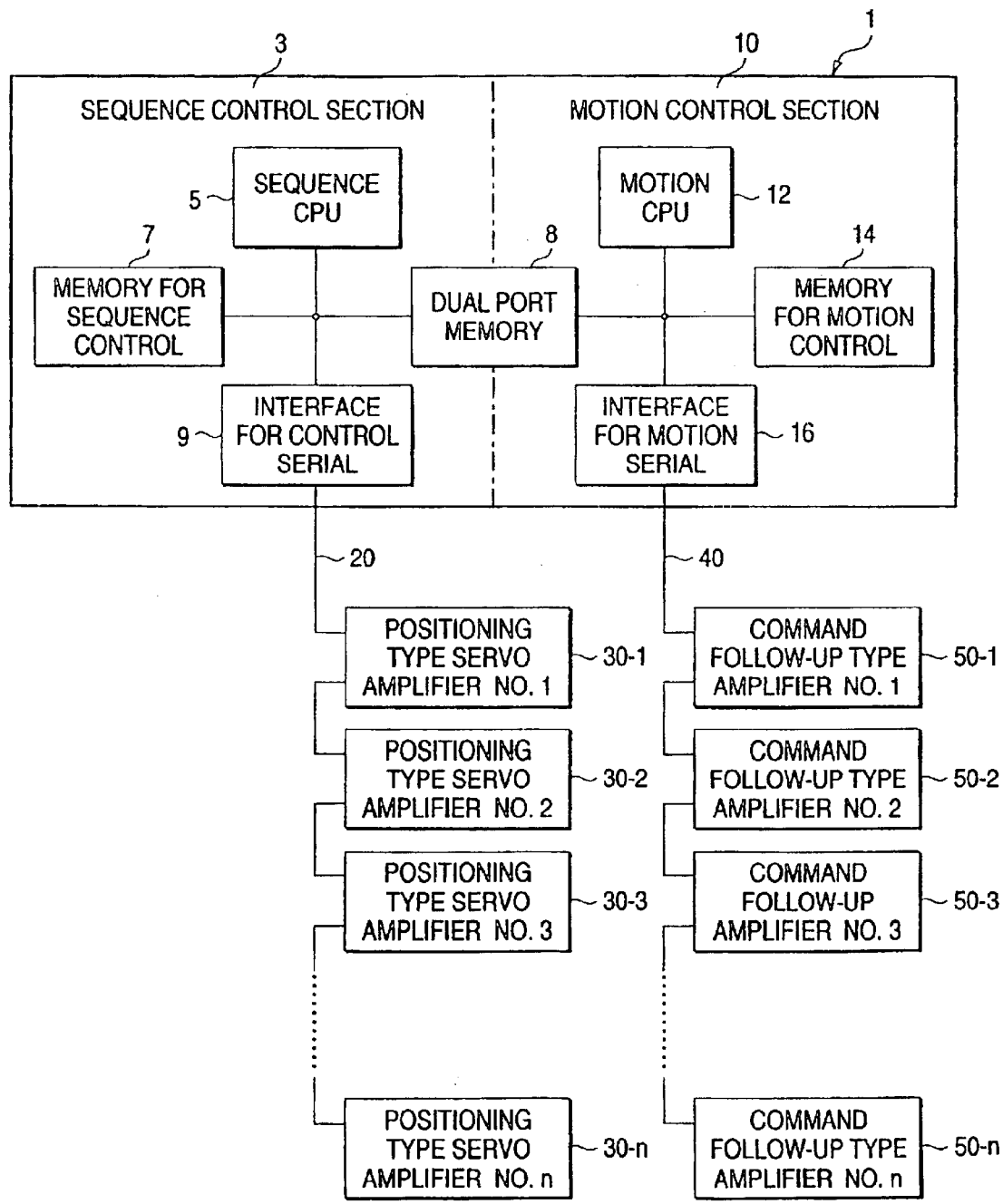
FIG. 6 is an overall arrangement view of a servo control system according to the related art.

Referring to FIGS. 1 to 3, an embodiment of the present invention will be explained below. FIG. 1 is an overall arrangement view of a servo control system of an embodiment of the present invention. FIG. 2 is a structural view showing an allocation of data of a dual port memory. FIG. 3 is a structural view of a frame of the sending and answer. Like reference numerals are used to indicate like parts in FIGS. 1 and 6, and explanations of the corresponding portions are omitted here.

In FIGS. 1 to 3, in the servo control system, the motion control section 10 is connected with the command follow-up type servo amplifiers 50-1, 5-2, which serve as the second servo amplifier, in series via I/F 16 for motion serial and the communication line 40. An end of the command follow-up type servo amplifier 50-2 is connected with the positioning type servo amplifiers 30-1, 30-(n-2) which serve as the first servo amplifier.

In this connection, each servo amplifier 30, 50 is connected with a servo motor (not shown). A difference between the command follow-up type servo amplifier 50 and the positioning type servo amplifier 30 is only one point at which the frame content (software) sent from the host controller 1 is different.

In this case, the command follow-up type servo amplifier 50 and the positioning type servo amplifier 30 have a serial I/F 60 connected with the communication line 40. The serial I/F 60 includes: a receiving buffer memory 62 in which received data is stored; a sending buffer memory 64 in which sending data is stored; and information reading section (not shown) for reading a content of the information section after the discrimination data of a frame 100 according to a control system command 201, 301 which serve as discrimination data of the frame 100 described later.

Therefore, the servo control system has a serial transmitting section for sending the command frame 100 from the host controller 1 to the servo amplifier 30, 50 at a predetermined communication period by means of serial communication being synchronized with the master clock of the host controller 1 and for sending an answer frame 400 from the servo amplifier 30, 50 to the host controller 1 by means of serial communication.

In a memory region 70 of the dual port memory 8, there are provided individual memory regions 71-1 to 71-n for each servo amplifier 30, 50, and also there is provided a common region 73, which is common among all the servo amplifiers 30, 50. The individual regions 71-1 to 71-n include: a control command signal data region 71a for storing a servo-on command signal and torque restriction command signal, which are as control signals; a state signal data region 71b for storing a servo operation state, which is as a state signal; a parameter region 71c for setting parameters of the servo amplifiers 30, 50; and an operation data region 71d for storing data such as a start point number for positioning a shaft (station), finish point number, command position and command speed, wherein these regions are allotted into the individual regions 71-1 to 71-n.

The common data region 73 is a region in which operation data of interpolation such as straight line interpolation operation and arc interpolation operation, which are operated when a plurality of shafts are combined with each other to operate, is stored. The common data region 73 includes: a control command signal data region 73a which is provided in the same manner as the data region for each station corresponding to the region for each station; a state signal data region 73b; a parameter region 73c; and an operation data region 73d.

FIG. 3 is a view showing a frame in which command data are sent all at once from the host controller 1 to all shafts (stations) of the servo amplifiers 30, 50.

The frame includes: the frame 100 from the host controller 1 to the servo amplifier 30, 50 (hereinafter, referred to as a command frame) and the frame 400 from the servo amplifier 30, 50 to the host controller 1 (hereinafter, referred to as an answer frame).

The head portion of the command frame 100 includes: a destination station ID 101 (an abbreviation of identification), which is set into a state common among all stations; a local station ID 103 showing the host controller 1; and data regions 121-1 to 121-n which are information sections of the servo amplifiers 30, 50 of all stations. The data regions 121-1 to 121-n has two types of data regions according to the types of servo amplifiers. One is a data region 200 (hereinafter, referred to as a command follow-up type data region), which serves as an information section to the command follow-up type servo amplifier 50 and the other is a data region 300 (hereinafter, referred to as a positioning type data region), which serves as an information section to the positioning type amplifier 30.

Since the destination station ID 101 is set into a state common among all stations, each servo amplifier 30, 50 is configured so that the command frame 100 is read in by all the reception buffer memories 62 and that in an inside memory (not shown), one data region corresponding to the station number (1 to n) in the data region 121-1 to 121-n of the command frame 100 is set, whereby only the data region concerned is read in from the reception buffer memory 62.

In order to recognize the local station, in each servo amplifier 30, 50, a rotary switch (not shown) capable of setting 1 to n is set at a value corresponding to the station number.

At the head portion of each data region 200, 300, the control system command 201, 301 is allotted, which is the discrimination data for discriminating whether the region is the command follow-up type data region 200 or the positioning type data region 300.

In this case, the command follow-up type data region 200 includes: a control system command 201, a present time command data region 203 for setting a command position, command speed and command torque as command data of present time; a present time control input signal command region 205 for setting a servo-on and servo-off command signal, torque restriction command signal, position command, speed command and control mode signal to switch the torque command; and a multiple object demand region 207 for rewriting the parameter data.

On the other hand, the positioning type data region 300 includes: a control system command 301; a positioning command data region 303 for setting a positioning command position, which is data necessary for positioning, moving speed, time constant of acceleration and deceleration, and positioning system; a present time control input signal command region 305 for setting an operation mode signal to designate original point returning operation and automatic operation as the operation mode and for setting an operation start command signal to start a positioning operation; and a multiple object demand region 307 for rewriting the parameter data.

The answer frame 400 includes: a destination station ID 402, which is the host controller 1; a local station ID 404, which specifies a servo amplifier; a control system answer 406, which is a region corresponding to the control system command 201, 301 of the command frame 100; a feedback data region 408 in which a position, speed and torque, which are the feedback information from the servo amplifier 30, 50, are updated for each communication period; a present time control state output signal region 410 for showing a state of the servo amplifier; and a multiple object answer region 412, which is an answer for a demand of the multiple object demand region 207, 307.

The present time control state output signal region 410 includes a state signal such as a servo-on signal and imposition stop signal which are common between both the servo amplifiers 30 and 50. A signal peculiar to the command follow-up type servo amplifier 50 includes a selected control mode signal showing a state in which a position, speed and torque are controlled. A signal peculiar to the positioning type servo amplifier 30 includes a selected operation mode signal showing an operation mode selected at present and a signal showing whether or not it is a positioning operation.

Figure 4:
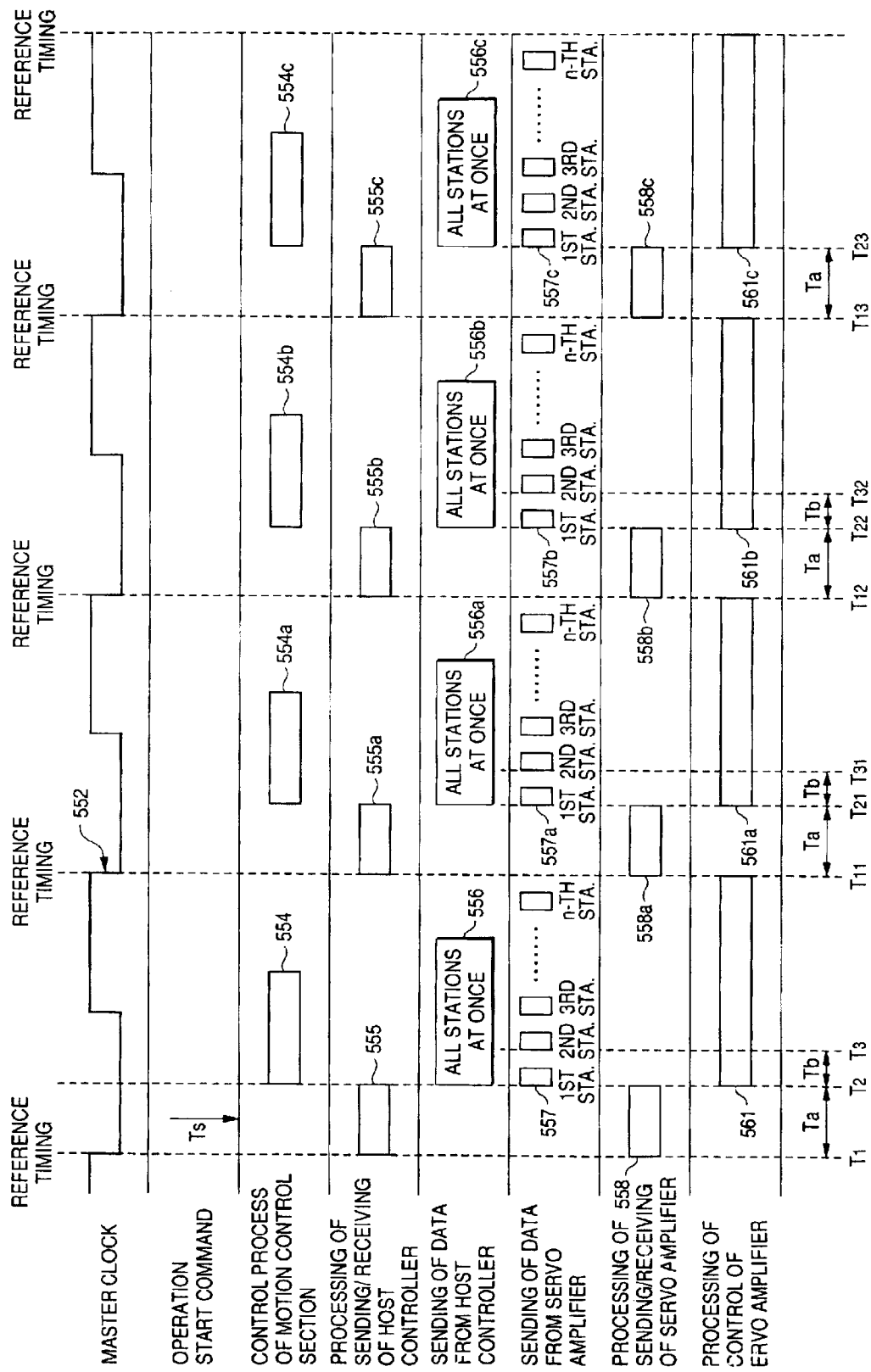
FIG. 4 is a timing chart of communication of the servo control system shown in FIG. 1.

Referring to FIGS. 1 to 4, operation of the servo control system configured as described above will be explained below. FIG. 4 is a communication timing chart of the servo control system. In the timing chart, all communication is conducted in the network by full duplex communication. The data sending 556, 556a to 556c (hereinafter, referred to as command data sending) from the host controller 1 to all station servo amplifiers 30, 50 and the data sending 557, 557a to 557c (referred to as answer data sending) from the servo amplifiers 30, 50 to the host controller 1 are conducted once in one period while being synchronized with the master clock 552.

First, before the command frame 100 is sent to the servo amplifier 30, 50, the sequence CPU 5 of the host controller 1 sets point table data, start point number and finish point number to the individual shaft operation region 71d in the individual shaft (station) data region 71 or the common operation data region 73d in the common data region 73 on the dual port memory 8. Then, the sequence CPU 5 turns on a mode selection signal for conducting point operation on the control command signal data region 71a, 73a. Then, the sequence CPU 5 turns on a start signal.

In this case, when the command of operation start is time TS, as a motion control processing 554, the motion CPU 12 receives a start signal at time T2, analyzes a point table in the individual shaft operation region 71d and common operation region 73d of the dual port memory 8, and calculates a present time position command in the case of command follow-up type servo amplifier 50.

At time T11, as a host controller sending and receiving processing 555a, the motion CPU 12 sets data, which shows that it is a command follow-up type, at the control system command 201 of the command frame 100 and writes the command position in the present time command data region 203.

On the other hand, in the case of the positioning type servo amplifier 30, as the host controller sending and receiving processing 555a, the motion CPU 12 sets data, which shows that it is the positioning type, at the control system command 201 of the command frame 100 and writes the positioning data in the positioning command data region 303. Then, the motion CPU 12 sets an operation mode selection signal and a start command signal in the present time control input signal command region 305.

Then, at time T21 when sending start delay time Ta has passed from time T11, as the all station (command data sending) processing 556a, the host controller 1 sends the command frame 100, which has been set as described above, to the receiving buffer memory 62 of the serial I/F 60 used of the servo amplifier 30, 50 via the I/F 16 for motion serial and the communication line 40. Since the destination station ID 101 of the command frame 100 is common among all stations, the servo amplifier 30, 50 stores the command frame 100 in all the receiving buffer memory 62 and reads one of the data regions 121-1 to 121-n corresponding to the first to the n-th station of the servo amplifier of the command frame 100 corresponding to the station number.

At time T12, each servo amplifier 30, 50 reads data of the command frame 100 from the receiving buffer memory 62 by the information reading section (not shown) as a sending and receiving processing 558b. At time T22, each servo amplifier 30, 50 reads the control system command 201, 301 in the data region 200, 300 as a servo amplifier control processing 561b. Due to the foregoing, it is judged whether data received at the present time is a command which should be given to the command follow-up type servo amplifier 50 or the positioning type servo amplifier 30. In the case where it is judged that data received at the present time is a command which should be given to the command follow-up type servo amplifier 50, a servo motor (not shown) is controlled according to the command follow-up type data region 200 of the command frame 100. On the other hand, in the case where it is judged that data received at present time is a command which should be given to the positioning type servo amplifier 30, a servo motor (not shown) is controlled according to the positioning type data region 300 of the command frame 100.

At time T13, as a sending and receiving processing 558c, each servo amplifier 30, 50 sets the present state signal in the present time control state output signal region 410 of the answer frame 400. At the same time, each servo amplifier 30, 50 sets the feedback data in the feedback data region 408 and writes the answer frame 400 in the sending buffer memory 64.

At time T23, as the answer data sending 557c, each servo amplifier 30, 50 sends the answer frame of the first station (shaft) to the host controller 1 and then sends to the second station (shaft) . . . the n-th station (shaft) in this order at substation delay time Tb intervals via the communication line 40 and the I/F 16 for motion serial.

In this case, the substation delay time Tb is set longer than the time necessary for sending the answer frame 400 of one station (shaft).

The host controller 1 can specify the servo amplifier 30, 50 according to the local station ID 404 contained in a plurality of answer frames 400 which have been received. Therefore, when a region of the command system answer 406 is read out, it is possible to confirm that data, which is referred at present, is an answer from the servo amplifier 30, 50 of the correct system.

As described above, the command follow-up type servo amplifier 50 and the positioning type servo amplifier 30 are mixedly arranged on the communication line 40 of the same system by one sending frame 100 generated by the host controller 1, so that control can be conducted in quick response.

In this connection, in the motion described in the above embodiment, the sending and receiving motion conducted between the host controller 1 and the servo amplifier 30, 50 is explained when the command of start of operation is given at time Ts. However, even when the command of start of operation is not given, the sending and receiving motion conducted between the host controller 1 and the servo amplifier 30, 50 is executed by the servo amplifier 30, 50 for the object of keeping the present position and receiving the command of start of operation.

Therefore, the motion control processing 554a to 554c, host controller sending and receiving processing 555, 555b, 555c, all station processing 556, 556b, 556c, sending and receiving processing 558, 558a, answer data sending 557, 557a, 557b and servo amplifier control processing 561, 561a, 561c are executed.

In the above embodiment, according to a demand of the servo motor which is an object to be controlled by the servo amplifier 30, 50, some times, it becomes necessary to change the positioning type servo amplifier 30 having a motion calculating function, which is not synchronized with the master clock of the host controller 1 to the command follow-up servo amplifier 50, which can calculate to be synchronized with the master clock of the host controller 1 and can conduct an interpolation calculation with another shaft or to change reversely. This is because consideration is given to a function peculiar to both servo amplifiers 30, 50.

Now, explanations will be made into a case in which the positioning type servo amplifier 30 is changed to the command follow-up type servo amplifier 50. When the host controller 1, which is information rewriting section of the command frame 100, receives a switch command to change the servo amplifier 30-1 to the command follow-up type servo amplifier 50-3, the host controller 1 changes the control system command 301 in the data region 121-3 of the command frame 100 for the third station of the servo amplifier to the control system command 201. At the same time, the host controller 1 sets the present time data region 203, present time control input signal command region 205 and multiple object demand region 207 so as to correspond to the command follow-up type.

When the host controller 1 changes the information section of the command frame 100 and the control system answer 406 of the answer frame 400 as described above, the servo amplifier 30 (50) can be changed from the positioning type to the command follow-up type, so that operation can be flexibly conducted according to a demand of the object to be controlled.

Embodiment 2

Figure 5:
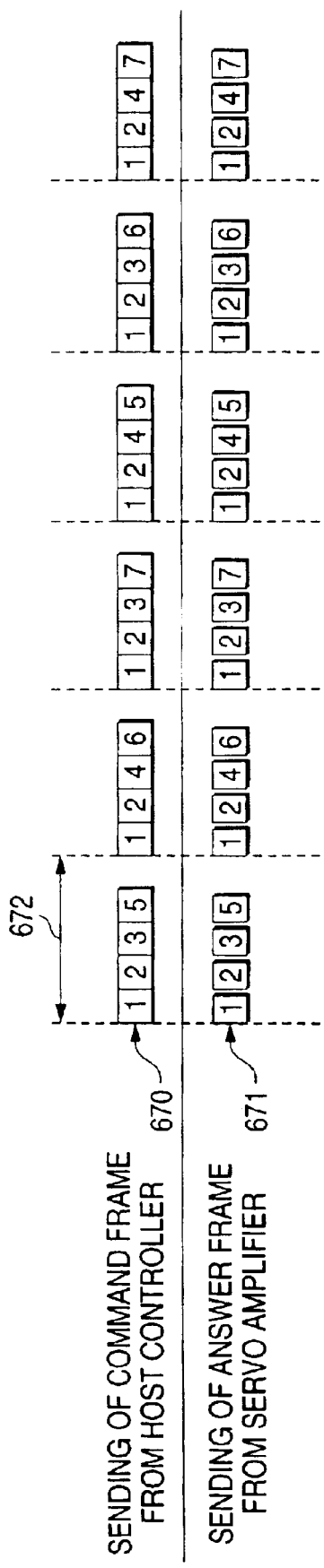
FIG. 5 is a communication timing chart in a servo control system in which servo amplifiers of different communication periods are mixedly arranged according to another embodiment of the present invention.

Referring to FIG. 5, another embodiment of the present invention will be explained below. FIG. 5 is a sending timing chart of the sending frame and the answer frame in the servo control system in which servo amplifiers of different communication periods are connected with the same network.

In FIG. 5, the sending of the command frame 100 is 670, the sending of the answer frame 400 is 671, and the reference communication period related to the master clock of the host controller 1 is 672. The frame capable of being sent in one period of the reference communication period 672 corresponds to four stations.

In this case, the communication period of the first station and that of the second station of the servo amplifier 30, 50 are equal to the reference communication period, and the communication period of the third station and that of the fourth station are twice as long as the period of the reference communication, and the communication period of the fifth station, that of the sixth station and that of the seventh station are three times as long as the period of the reference communication.

In this case, the host controller 1 includes a sending side communication switching section for updating data of the command frames 100 and the answer frame 400 of the first and the second station every reference communication period 672, updating data of the command frames 100 and the answer frame 400 of the third and the fourth station alternately every reference communication period 672 so that the period becomes twice as long as the reference communication period 672, and updating data of the command frames 100 and the answer frame 400 of the fifth to the seventh station reload data every three periods of the reference communication period 672. The servo amplifiers 30, 50 are provided with the answer side communication switching section.

According to the above, it is possible to make the servo amplifiers 30, 50 having different communication periods, which are natural number times as long as the reference communication period 672, mixedly exist in the network of the same system so that they are connected.

Therefore, even if a high speed response is demanded from some shafts in the network in which one host controller controls a plurality of shafts by the same communication period, it is unnecessary to provide a plurality of the I/F 16 for motion net. Therefore, it is possible to obtain a simple servo control system.

As described above, according to a first invention, there is provided with:

a host controller having a master clock, which is a reference of communication, the host controller for sending a command;

a first servo amplifier controlled based on the command sent from the host controller, the first servo amplifier having a calculating function, which is not synchronized with the master clock;

a second servo amplifier controlled based on the command sent from the host controller, the second servo amplifier having a calculating function, which is synchronized with the master clock; and a serial transmitting means for serially transmitting a frame, which is the command, having discrimination data indicating the first or the second servo amplifier and control information of the first and the second servo amplifiers in an information section into which information to be transmitted is inputted and serially transmitting from the host controller to the first and the second servo amplifier, wherein the first and second servo amplifiers comprise information section reading means for reading content of the information section after the discrimination data of the frame based on the discrimination data of the frame. Thus, it is possible to conduct controlling while the response property is being enhanced by making the first and the second servo amplifier mixedly exist in the network of one system.

According to the second invention, in addition to the effects of the first invention, there is provided with a plurality of the first or the second servo amplifiers, wherein the first or the second servo amplifiers includes:

a reference servo amplifier for communicating by a reference communication period generated based on the master clock;

a multiple time servo amplifier for communicating by a communication period which is multiple times as long as the reference communication period; and communication switching means for communicating with the multiple time servo amplifier every multiple times of the reference communication period. Thus, it is possible to make the multiple time servo amplifiers, the communication periods of which are natural number times as long as the reference communication period, mixedly exist in the network of the same system so that the frames can be sent and received.

INDUSTRIAL APPLICABILITY

As described above, the servo control system of the present invention is suitable for connecting a plurality of types of servo amplifiers to one network and controlling.

What is claimed is:

1. A servo control system comprising:

a host controller having a master clock, which is a reference of communication, the host controller for sending a command;

a first servo amplifier controlled based on the command sent from the host controller, the first servo amplifier having a calculating function, which is not synchronized with the master clock;

a second servo amplifier controlled based on the command sent from the host controller, the second servo amplifier having a calculating function, which is synchronized with the master clock; and a serial transmitting section for serially transmitting one frame at once, which is the command, having discrimination data indicating the first or the second servo amplifier and control information of the first and the second servo amplifiers in an information section into which information to be transmitted is inputted and serially transmitting from the host controller to the first and the second servo amplifier, wherein the first and second servo amplifiers comprise an information section reading section for recognizing a local station and reading content of the information section after the discrimination data of the frame based on the local station and the discrimination data of the frame.

2. The servo control system according to claim 1, further comprising a plurality of the first or the second servo amplifiers, wherein the first or the second servo amplifiers includes:
a reference servo amplifier for communicating by a reference communication period generated based on the master clock;
a multiple time servo amplifier for communicating by a communication period which is multiple times as long as the reference communication period; and
a communication switching section for communicating with the multiple time servo amplifier every multiple times of the reference communication period.

* * * * *